United States Patent
Little et al.

(10) Patent No.: US 8,960,583 B2
(45) Date of Patent: Feb. 24, 2015

(54) FIXED SPOOL FISHING REEL

(75) Inventors: Andrew John Little, West Huntingfield (GB); Adam Richard Ellis Taylor, Loughton (GB)

(73) Assignee: Fox International Group Limited, Hainault, Essex (GB)

(*) Notice: Subject to any disclaimer, the term of this patent is extended or adjusted under 35 U.S.C. 154(b) by 564 days.

(21) Appl. No.: 13/254,686

(22) PCT Filed: Apr. 1, 2010

(86) PCT No.: PCT/GB2010/000663
§ 371 (c)(1),
(2), (4) Date: Oct. 24, 2011

(87) PCT Pub. No.: WO2010/112871
PCT Pub. Date: Oct. 7, 2010

(65) Prior Publication Data
US 2012/0266705 A1 Oct. 25, 2012

(30) Foreign Application Priority Data
Apr. 3, 2009 (GB) .................................. 0905869.4

(51) Int. Cl.
*A01K 89/01* (2006.01)
(52) U.S. Cl.
CPC ............. *A01K 89/01* (2013.01); *A01K 89/0105* (2013.01)
USPC ........................................ 242/255; 242/282
(58) Field of Classification Search
CPC ........................ A01K 89/0105; A01K 89/0114
USPC .......................................... 242/255, 278, 282
See application file for complete search history.

(56) References Cited

U.S. PATENT DOCUMENTS

| | | | | |
|---|---|---|---|---|
| 2,807,965 A | * | 10/1957 | Frank | 74/371 |
| 3,250,489 A | * | 5/1966 | Hiromitsu | 242/255 |
| 3,600,964 A | * | 8/1971 | Sarah | 74/339 |
| 3,675,502 A | * | 7/1972 | Sarah | 74/369 |
| 4,077,587 A | * | 3/1978 | Ueda | 242/255 |
| 4,850,549 A | * | 7/1989 | Sakumoto | 242/255 |
| 4,865,262 A | * | 9/1989 | Tsunoda | 242/241 |
| 6,672,526 B1 | * | 1/2004 | Bledsoe et al. | 242/255 |

FOREIGN PATENT DOCUMENTS

| | | | |
|---|---|---|---|
| CH | 268 095 | | 5/1950 |
| DE | 918476 | * | 9/1954 |
| DE | 921060 | * | 12/1954 |

(Continued)

*Primary Examiner* — Emmanuel M Marcelo
(74) *Attorney, Agent, or Firm* — Clark & Brody (57) ABSTRACT

A fixed spool fishing reel having a handle shaft connected to a handle to be rotated thereby and coupled to a bail arm drive of the wheel so that rotation of the handle shaft causes rotation of the bail arm. The handle shaft is coupled to the bail arm drive via a gear mechanism that enables the gear ratio between rotation of the handle shaft and rotation of the bail arm drive to be selectively altered. Also, a fixed spool fishing reel having a spool shaft and two gear wheels respectively on opposite sides of the spool shaft, both gear wheels being coupled to be driven by a rotary handle of the reel and both being selectable to be the one which drives a spool shaft oscillatory mechanism of the reel, the coupling between each of the said two gear wheels and the mechanism being via respective gearing arrangements to impart different respective ratios of handle rotary speed to oscillatory speed of the spool shaft.

11 Claims, 13 Drawing Sheets

(56) References Cited

FOREIGN PATENT DOCUMENTS

| | | | |
|---|---|---|---|
| FR | 1074776D A | * | 10/1954 |
| GB | 925964 | * | 5/1963 |
| GB | 2 433 405 | | 6/2007 |
| WO | 98/24310 | | 6/1998 |

* cited by examiner

FIXED SPOOL FISHING REEL

The present invention relates to a fixed spool fishing reel having a handle shaft connected to a handle to be rotated thereby and coupled to a bail arm drive of the wheel so that rotation of the handle shaft causes rotation of the bail arm.

Such a fishing reel is used in a sport referred to as "high speed jigging". This involves fishing at sea in which a jig comprising for example a hook, a lure and a weight at the end of a line is cast into the sea and allowed to drop whilst attached to the line many hundreds of feet below the surface of the water. The reel is then used to wind-in the line, thus raising the rig at high speed. The raising of the jig in this way attracts a fish which may bite on to the hook so that the fish may now be reeled-in.

A disadvantage of such a fishing reel which has already been proposed is that the forces which can be exerted on the fish by the angler with such a reel are insufficient to play the fish towards the boat with reasonable ease.

The present invention seeks to provide a remedy, although it will be appreciated that the benefit of the present invention is not restricted to high speed jigging.

Accordingly, a first aspect of the present invention is directed to a fixed spool fishing reel having the construction set out in the opening paragraph of the present specification, in which the handle shaft is coupled to the bail arm drive via a gear mechanism that enables the gear ratio between rotation of the handle shaft and rotation of the bail arm drive to be selectively altered.

It will be understood by those familiar with the art of fishing reels that a fixed spool fishing reel is one in which the spool itself does not rotate. However, it does reciprocate as the bail arm rotates to lay the line evenly on to the spool.

The handle shaft may be longitudinally slidable and a portion of the handle shaft may be provided with external teeth around its circumference which can engage internal teeth of either selected one of two gear wheels which surround and are generally or substantially orthogonal to the handle shaft axis, by virtue of its being able to slide longitudinally.

Each of the said internal teeth and/or the said external teeth may be chamfered or bevelled in a plane which is generally or substantially orthogonal to the direction of projection of the tooth.

Alternatively or in addition, each of the said internal teeth and/or each of the said external teeth may be rounded in a plane generally or substantially orthogonal to the direction of projection of the tooth.

Each tooth may be bevelled and/or rounded in this way on one side only, or it may be bevelled and/or rounded in this way more on one side than the other, the side of the tooth which is less bevelled and/or rounded, or which is not bevelled and/or rounded, having a flat which is urged against one of the said internal teeth when the reel is in use to effect rotation of the bail arm.

The slidable handle shaft may be hollow and of non-circular internal cross-section at least at its two ends to enable a spigot of the handle, having an external cross-section corresponding to the internal cross-section of the slidable handle shaft, to be inserted therein at either selected one of the ends of the handle shaft to facilitate ready alteration of the reel between left and right-handed drive.

The construction of the reel may be such that either selected one of the said two gear wheels may be used to drive one and the same crown wheel which constitutes a part of the bail arm drive. The crown wheel may be orientated generally or substantially orthogonally to the handle shaft axis. The axis of rotation of the crown wheel may be generally or substantially co-linear with the handle shaft axis. One of the said two gear wheels may be fixed relative to the crown wheel. The other of the said two gear wheels may be coupled to drive the said one of the said two gear wheels through further gearing.

The reel may be provided with a user operable lever coupled to the slidable handle shaft by way of a shaft coupling to slide the latter into engagement with a selected one of the said two gear wheels and out of engagement with the other of the said two gear wheels. The lever may be arranged on an intended underside of the reel underneath and generally or substantially equidistant from the two ends of the handle shaft.

The shaft coupling may comprise a first movable member which is movable longitudinally of the shaft axis and a second movable member which is movable transversely of the shaft axis, such transverse movement of the latter being effected by the said user operable lever and the first movable member being coupled to the second movable member by way of at least one slanting recess or aperture in one of the said first and second movable members being engaged by a spigot on the other of the said first and second movable members so that such transverse movement of the said second movable member effects such longitudinal movement of the said first movable member.

Such a shaft coupling does not interfere with a changeover between left-hand and right-hand drive.

Preferably, the slanting recess or aperture is provided in the said second movable member.

The shaft coupling may comprise a spring mechanism such that the operation of the lever urges the handle shaft in a longitudinal direction, and the shaft is actually moved in that direction if and when the said external teeth are positioned to engage the internal teeth of the selected one of the said two gear wheels.

The spring mechanism may comprise first and second parts movable longitudinally of the handle shaft and linked together by at least one tension spring, so that movement of one of those parts away from the other will urge the other to follow it in the same direction, a protuberance extending from the said shaft and located between those parts, and a third part which is movable longitudinally of the handle shaft by operation of the said user operable lever, the said third part having at least one portion which extends between the said first and second parts, whereby such longitudinal movement of the said third part may move the said first and second parts in the said direction and with them the said protuberance and hence the handle shaft, if the said external teeth are in a position at that time to engage the internal teeth of the selected one of the said two gear wheels, whereas if such engagement is not possible at that time, only one of the said first and second parts is moved in the said direction, creating tension or increased tension in the said at least one spring, and the other of the said two parts and with it the said protuberance and hence the handle shaft follow that movement under the action of the said at least one tension spring when the said external teeth are next in a position to engage the internal teeth of the selected one of the said two gear wheels.

The said protuberance may comprise a flange around the circumference of a portion of the slidable handle shaft.

The said third part may be the said first movable member.

According to a second aspect of the present invention, there is provided a fixed spool fishing reel having a spool shaft and two gear wheels respectively on opposite sides of the spool shaft, both gear wheels being coupled to be driven by a rotary handle of the reel and both being selectable to be the one which drives a spool shaft oscillatory mechanism of the reel, the coupling between each of the said two gear wheels and the mechanism being via respective gearing arrangements to impart different respective ratios of handle rotary speed to oscillatory speed of the spool shaft.

This facilitates selective connection of the handle to one side of the reel or the other. To this end the handle may be readily releaseably connected to either selected one of the two sides of the reel.

Advantageously, the spool shaft has a slot in it, and the coupling between one of the said gear wheels and the mechanism is by way of a shaft which passes through the said slot.

This facilitates acceptable values for the said ratios.

The two gear wheels are preferably selectively engaged by at least one dog gear which is movable towards and away from both of the said two gear wheels.

There may be two such dog gears at opposite ends of a shaft, the dog gears respectively engaging the said two gear wheels.

The dog gear shaft may be hollow and a drive shaft which drives both of the said two gear wheels via the dog gear shaft may extend through that hollow shaft.

The or both dog gears may be moved towards and away from one or both of the said two gear wheels by way of a lever coupled to the or both dog gears via a resilient member whereby the or each dog gear will be urged into engagement with one of the said two gear wheels, and will so engage once they have an appropriate relative angular position.

This enables the gearing between each of the said two gear wheels and the said mechanism to remain in engagement whether in use or not, and whether or not the lever is operated.

An example of a fixed spool fishing reel made in accordance with the present invention will now be described with reference to the accompanying drawings, in which.

Figure 1:
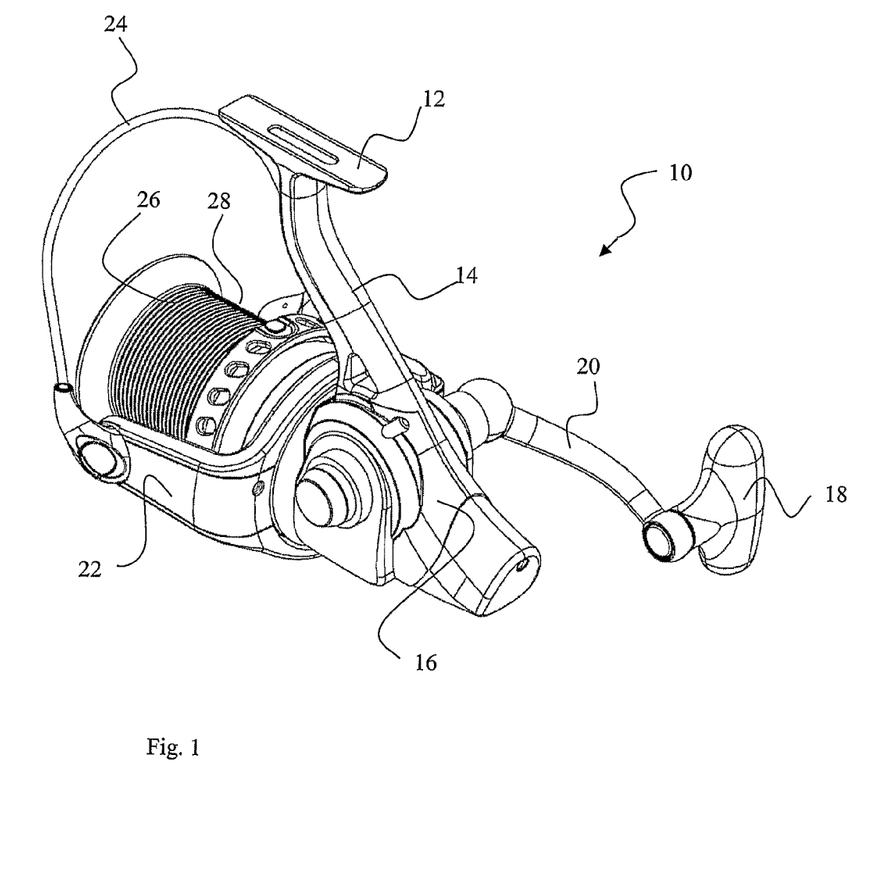
FIG. 1 shows a perspective view from the rear and to one side of a fixed spool fishing reel embodying the present invention.
Figure 2:
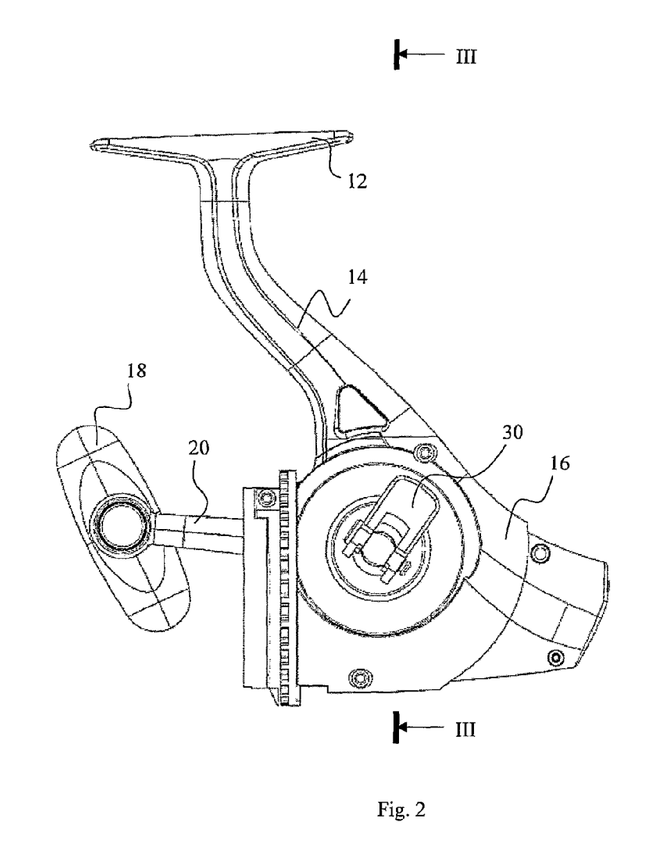
FIG. 2 shows a view from one side of parts of the fishing reel shown in FIG. 1.

A fixed spool fishing reel 10 shown in FIG. 1 comprises a mounting foot 12, a support arm 14 extending in an intended downward direction from the mounting foot 12 to the reel housing 16, a handle 18 rotatably mounted on a crank 20 connected to the housing 16, a bail arm 22 with a bail 24, and a skirted spool 26 extending forwardly from the front of the housing 16 with its axis parallel to the foot 12 and hence to an angling rod to which the reel is attached when the latter is in use.

When in use, with the fishing line 28 wound around the spool 26 and a rig (not shown) attached to the free end of the line 28, and with the bail arm 24 in an open position, the user holds the line against spillage with a finger as he prepares to cast the line and then sharply whips the rod and the reel with the free end of the line on the rigging attached thereto forwardly so that the rigging is cast forwards as the line spills off the front end of the spool. Once the rigging has been cast and the rigging has dropped many hundreds of feet below the surface of the water. The handle 18 is now rotated and the bail arm 24 is swivelled rearwardly to the position it has in FIG. 1, to wind the line back on to the spool 26. This is effected by couplings within the housing 16 (not shown in FIG. 1) which simultaneously cause rotation of the bail arm 22 about the axis of the spool 26 and reciprocation of the latter to and fro along its axis. This ensures an even lay of the line 28 on the spool 26. During this phase of operation of the reel, which results in the rigging being lifted towards the surface of the sea very rapidly, the ratio of turns of the bail arm 22 completes seven turns for every single turn of the crank 20. In the event that a fish bites on the jigging as it is being raised in this fashion, a user operable lever 30 shown in FIGS. 2 to 5 is now shifted outwardly into its second position to change the gearing by way of a gearing mechanism 32 within the housing 16. This changes the ratio of turns of the bail arm 22 to each turn of the crank 20 from 7:1 to 2:1. The lever 30 is shown in its setting 4 in this phase of operation of the reel.

Figure 3:
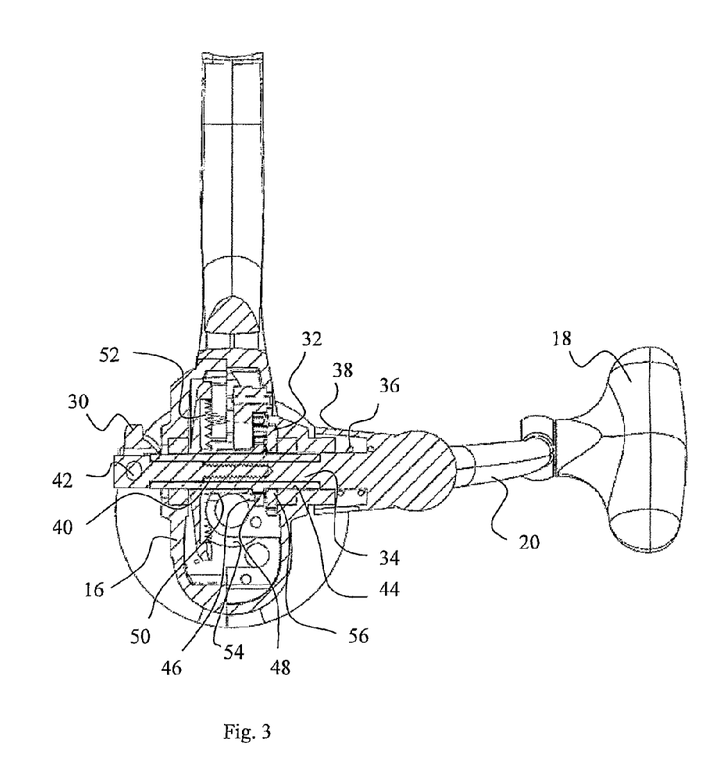
FIG. 3 shows a cross-sectional view of the reel shown in FIG. 2 in the plane indicated by the line of FIG. 2.
Figure 4:
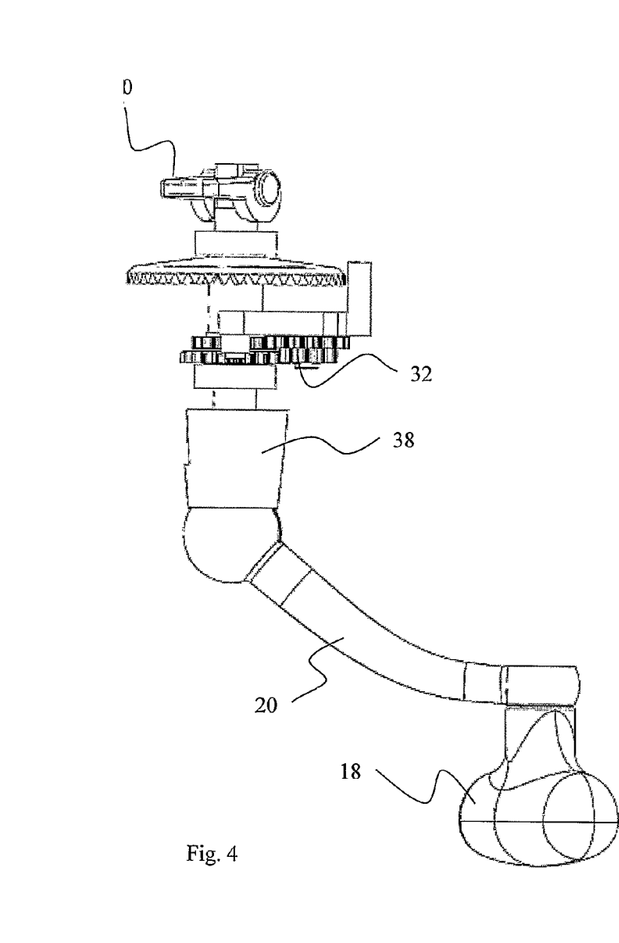
FIGS. 4 and 5 show respective views of parts of the reel shown in FIGS. 2 and 3 from above and from the front of the reel shown in FIGS. 2 and 3.
Figure 5:
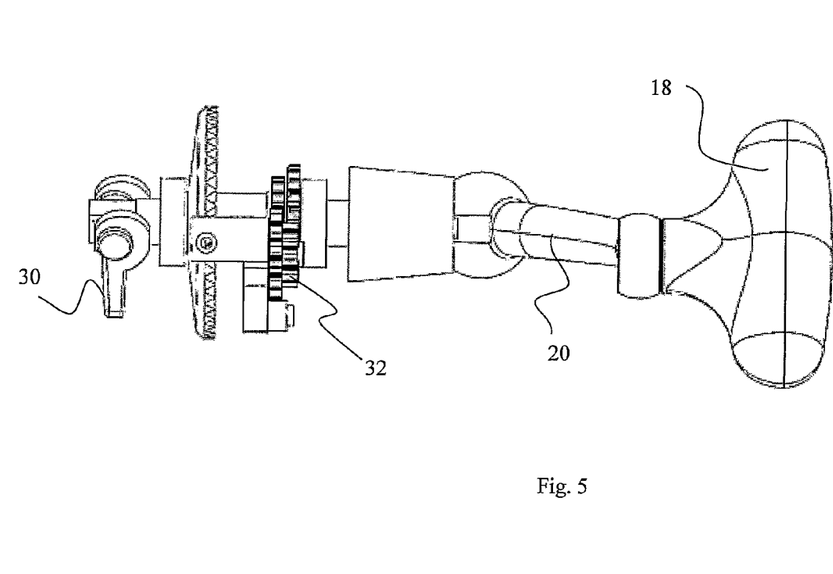

Details of the manner in which this change of gear is effected is shown more clearly in FIG. 3. Thus, the crank 20 is connected to a handle shaft 34 which extends through the housing 16 transversely of the spool axis, the end of the shaft 34 that projects outwardly from the housing 16 on the crank side thereof is surrounded by a compression spring 36 located between the housing 16 and an inner end of the crank 20. The spring 36 is covered by a skirt portion 38 extending from the inner end of the crank 20.

FIG. 3 shows that the shaft 34 comprises a number of parts to facilitate assembly. A portion of the shaft 34 extending from the crank 20 has an internally screw-threaded hollow which receives an externally screw-threaded shank portion 40 extending from that portion of the shaft 34 which projects from the housing 16 on the side further from the crank 20. An outer end of the latter is provided with a pivot 42 to which is connected the lever 30 in such a manner that operation of the lever 30 outwardly from the housing 16 enables the shaft 34 to slide in a direction towards the crank 20 under the action of the compression spring 36. Movement of the user operable lever 30 back to the position it has in FIGS. 2 and 3 draws the shaft 34 in a direction away from the crank 20 against the action of the compression spring 36. A snap action (not shown) holds the lever 30 in this position until the user moves it once again to the outward position.

The shaft 34 is provided with a sleeve 44 which is fixed relative to the portions of the shaft 34 which extend through it and which is provided with a series of splines or external teeth 46 extending around a portion of its circumference. In the setting shown in FIG. 3, these teeth 46, which are external teeth in the sense that they extend around the outside of the shaft 34, engage internal teeth of a first gear wheel 48 which surrounds the shaft 34 and is generally or substantially orthogonal thereto. This gear wheel 48 is fixed to and integral with a sleeve portion 50 which is coaxial with and rotatable in relation to the shaft 34. The sleeve portion 50 in turn is fixed to and integral with a crown wheel 52, the latter having an axis of rotation which is co-linear with the axis of the shaft 34. It is coupled to drive a further gear 54 coupled to rotate the bail arm 22. A second gear wheel 56 also surrounds and is generally or substantially orthogonal to the shaft 34 and is also provided with internal teeth, and external teeth which engage the gearing mechanism 32 coupled to the said first gear wheel 48. This second gear wheel 56 is immediately adjacent and on the crank side of the said first gear wheel 48. As a result, when the lever 30 is moved outwardly from the housing 16 to enable the shaft 34 to slide longitudinally in a direction towards the crank 20 under the action of the compression spring 36, the splines or external teeth 46 of the shaft 34 slip out of engagement with the internal teeth of the gear wheel 48 and engage the internal teeth of the gear wheel 56. Under such a change of gear, one portion of the crank 20 now rotates the crown wheel 52 a higher number of turns than it did in the setting illustrated in FIG. 3, by virtue of the gearing mechanism 32.

The second embodiment of the present invention is illustrated in FIGS. 6 to 12.

Figure 6:
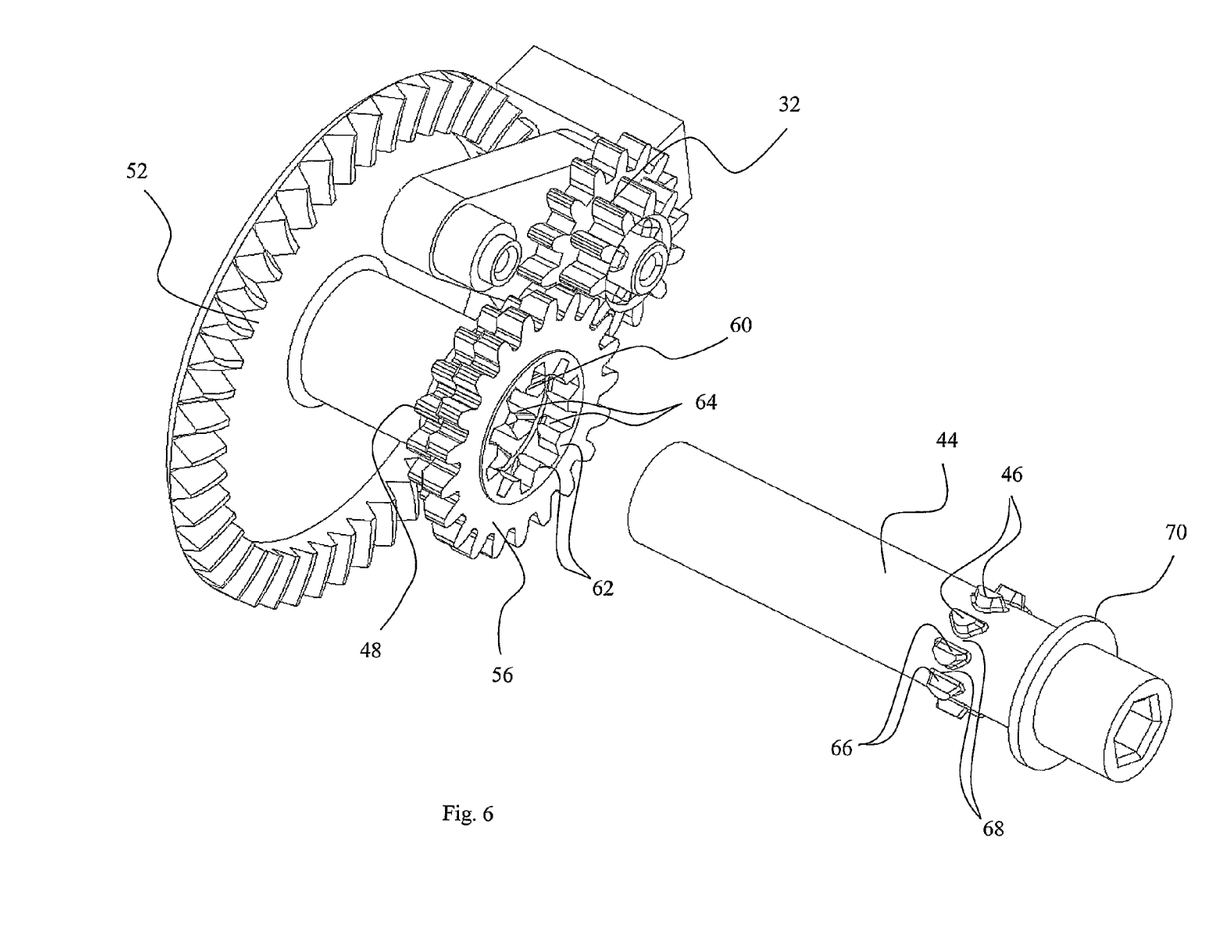
FIG. 6 shows on a larger scale a perspective partly exploded view from above and to one side of parts of a second embodiment of a fixed spool fishing reel made in accordance with the present invention.
Figure 7A:
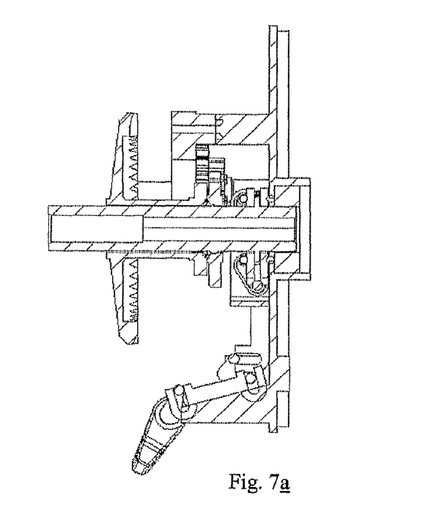
FIGS. 7a to 7d show on a smaller scale an axial sectional view, a view from the rear and from one side, a view from one side, and a view from above, respectively, of the parts as well as further parts of the second embodiment, in a first setting.
Figure 7B:
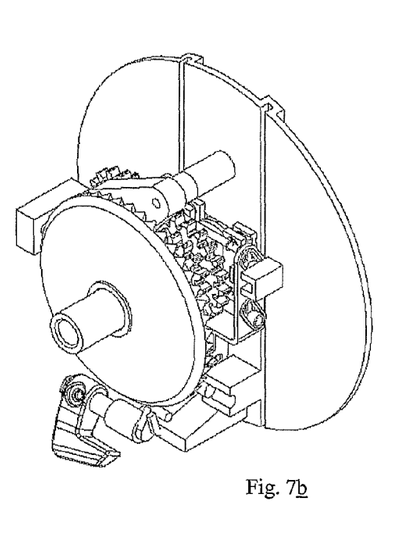
Figure 7C:
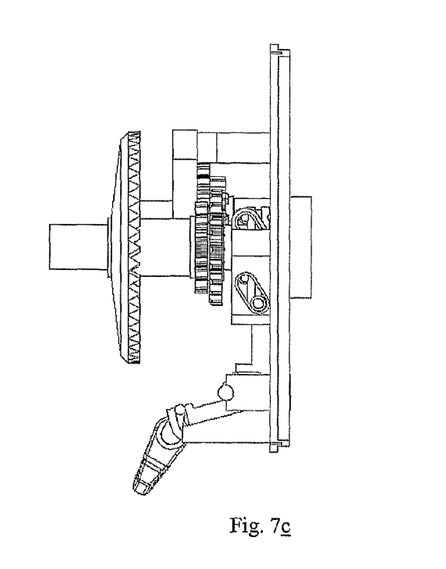
Figure 7D:
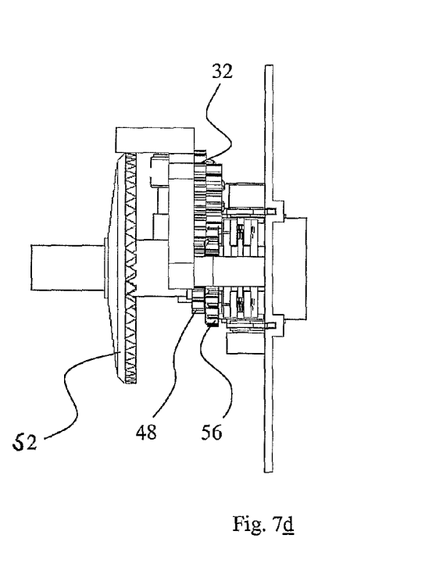
Figure 8A:
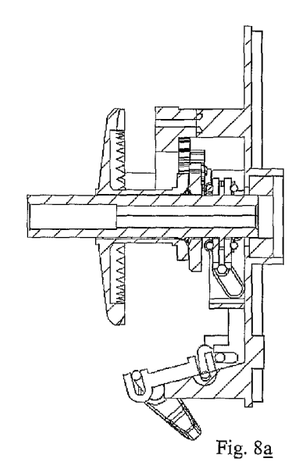
FIGS. 8a to 8d show an axial sectional view, a view from the rear and from one side, a view from one side, and a view from above, respectively, of parts of the second embodiment in a second setting.
Figure 8B:
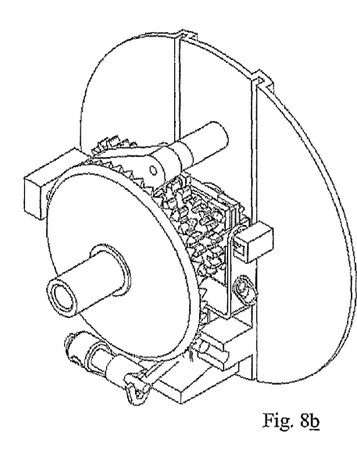
Figure 8C:
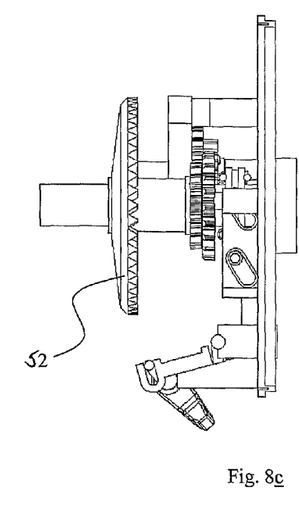
Figure 8D:
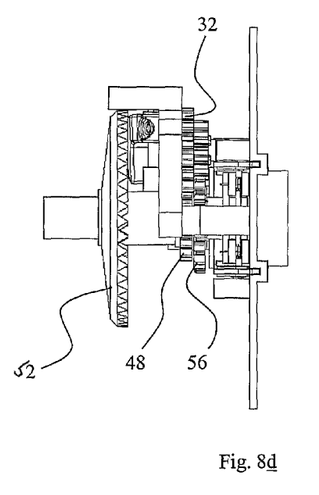
Figure 9A:
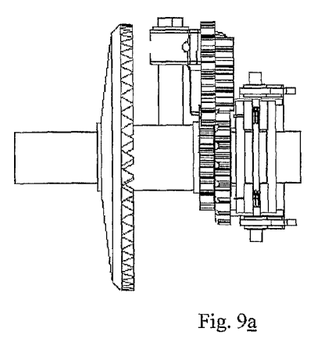
FIGS. 9a to 9d show respective views from above of parts of the reel shown in FIGS. 7 and 8, with respective different settings thereof.
Figure 9B:
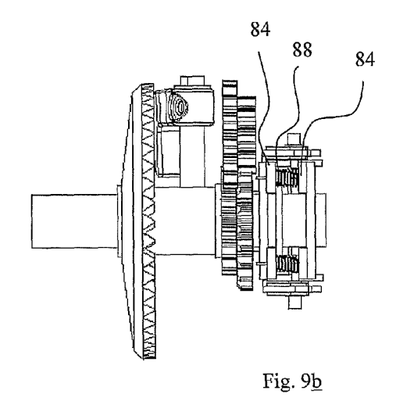
Figure 9C:
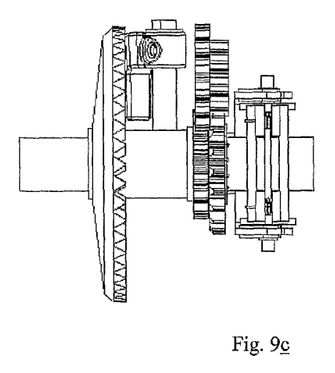
Figure 9D:
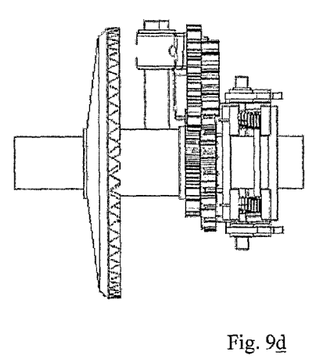
Figure 10A:
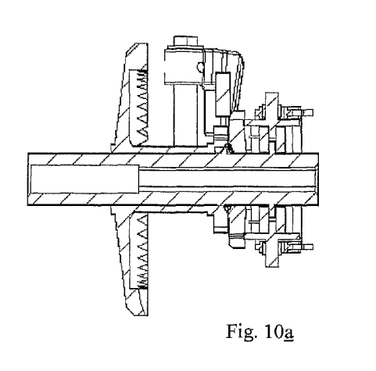
FIGS. 10a to 10d show respective axial cross-sections from above of the parts shown in FIGS. 9a to 9d, respectively.
Figure 10B:
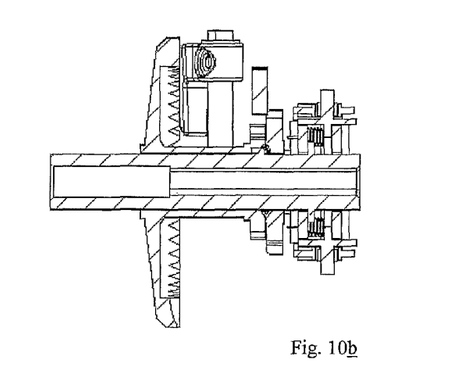
Figure 10C:
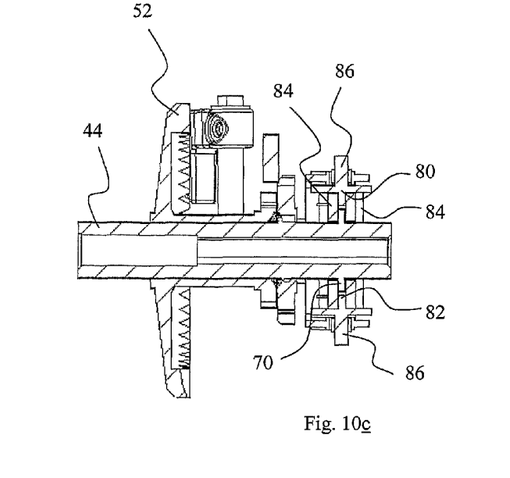
Figure 10D:
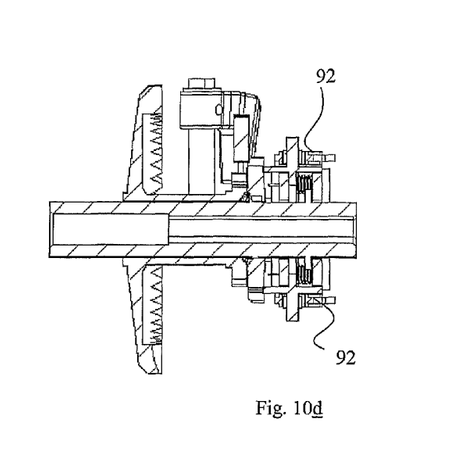

The parts shown in FIG. 6, and the angle at which they are shown, is especially helpful to an understanding of how these parts cooperate together. So far as the parts shown in FIG. 6 is concerned, apart from certain dimensions and apart from a flange (to be referred to) around the shaft (also to be referred to herein), those parts shown in FIG. 6 which correspond to parts already illustrated are accorded the same reference numerals as used in FIGS. 3 to 5.

It can be seen from FIG. 6 that the gear wheels 48 and 56 are substantially and immediately adjacent to one another, such separation as there is between them being less than 10% of the width of each. The gear wheel 48 has internal teeth 60 and the gear wheel 56 has internal teeth 62. Each tooth 60 and 62 has a flat 64 facing in an anti-clockwise sense about the common axes of these wheels 48 and 56, as viewed in the manner shown in FIG. 6. The side of each tooth 60 which is adjacent to the wheel 56, and the side of each tooth 62 which is adjacent to the wheel 48, is chamfered or bevelled in planes which are perpendicular to the direction of extension of the tooth. If the flat 64 of the tooth is considered to be the front of the tooth, the face of the chamfering or beveling is directed rearwardly of the tooth and outwardly of the wheel of which the tooth is a part. The edges of the tooth are generally rounded to reduce the likelihood of wear and friction. The splines or external teeth 46 and the sleeve 44 are each provided with a flat 66 directed in a clockwise sense around the axis of the sleeve 44, and consequently also the axes of rotation of the gear wheels 48 and 56, viewing these parts in the direction of view of FIG. 6. Considering these flats 66 to be at the front of the splines or external teeth 46, the rear side 68 of each spline or external tooth 46 is generally arcuate and convex. In addition, the edges of the splines or external teeth 46 are rounded to reduce wear and friction.

A flange 70 is integral with and extends around a portion of the sleeve 44 spaced to the right of the splines or external teeth 46 as viewed in FIG. 6. When the parts shown in FIG. 6 are assembled for operation, the sleeve 44 is slidable in a longitudinal direction relative to its axis so that the splines or external teeth 46 may engage the internal teeth 60 or 62 of either selected one of the two gear wheels 48 and 56. A mechanism to be described herein engages the flange 70 to shift the sleeve 44 to the left or to the right as viewed in FIG. 6. When a change of gear is made, the various component parts will usually, but not necessarily, be stationary. The change of engagement of the splines or external teeth 46 from the internal teeth 60 of the gear wheel 48, so that the sleeve 44 is to be shifted to the right as in FIG. 6 and the splines or external teeth 46 are to move into engagement with the internal teeth 62 of the gear wheel 56, will be considered first. The sleeve 44 is urged rightwardly to effect this change by a spring mechanism to be described herein. If the teeth 62 happen to be in registration with the teeth 60 at this stage, the sleeve 44 will move fully to the right to enable an immediate change of engagement of the teeth 46 from the teeth 60 of the wheel 48 to the teeth 62 of the wheel 56.

It will be appreciated that because of the gear mechanism 32, the gear wheel 48 rotates faster than the gear wheel 56. If, therefore, at the time of switching, the teeth 62 and the teeth 60 are not in registration with one another, the teeth 46 will slide towards the teeth 62 so that they engage the chamfered or bevelled sides of the teeth 62, until full engagement of the teeth 46 with the teeth 62 is possible when the teeth 60 are next in registration with the teeth 62.

Considering a transfer of engagement of the teeth 46 from the internal teeth 62 of the wheel 56 to the internal teeth 60 of the wheel 48, a similar sequence of events will occur bearing in mind now that the wheel into which the teeth 46 are urged is the faster moving of the two wheels 48 and 56. Again, if the teeth 60 and 62 are in registration at the time the sleeve 44 is urged in the left direction as viewed in FIG. 6, the change of gear will be immediate. If, therefore at the time of switching the teeth 62 are positioned in a clockwise sense slightly ahead of the teeth 60, then at the time of switching, the teeth 46 will be unable to engage the internal teeth 60 fully until the latter have caught up with the teeth 62, whereupon the teeth 46 will be free to slide into full engagement with the teeth 60.

If on the other hand at the time of switching, the teeth 60 are positioned slightly ahead of the teeth 62 in a clockwise sense, the teeth 46 will slide towards the gap between the teeth 60 until a slanting rear flank of each tooth 46 abuts the chamfered or bevelled side of an adjacent tooth 60. From here, further rotation of the sleeve 44 by the crank 20 will cause the teeth 46 to rotate the wheel 56, and consequently through the gear mechanism 32 the wheel 48 at a faster rate so that each tooth 60 will catch up and overtake the adjacent tooth 62. As this happens, the teeth 46 are first pushed out of the gaps between the teeth 60 by virtue of the chamfered or bevelled sides thereof until the face 64 of each tooth 60 passes the flat face 66 of the adjacent tooth 46, whereupon the latter is now free to slide in the adjacent gap between teeth 60 so that the teeth 46 now fully engage the teeth 60.

A mechanism by which longitudinal sliding of the sleeve 44 is effected, is shown more clearly in FIGS. 7 to 12. In these Figures, corresponding parts, which have already been labelled with reference numerals in the preceding Figures, have been given the same reference numerals in these Figures.

A shift member 80 extends above the and below the sleeve 44. It has inner portions 82 which are sandwiched between plates 84 and has a pair of spigots 86 projecting outwardly from opposite sides of the switching member 80. The plates 84 are connected together by tension springs 88. The flange 70 of the sleeve 44 is also sandwiched between the plates 84.

A stirrup 90 is provided with two sides 92 which extend on opposite sides of the sleeve 44. Each side 92 is provided with a pair of elongate apertures 94, which slant in relation to a plane perpendicular to the axis of the sleeve 44. The spigots 84 extend into the slanting apertures 94. A user operable lever 96 is pivotally attached to the underside of the housing 16 in FIG. 1 so as to be pivotable to the left or to the right viewing the reel along the direction of the axis of the spool 26, or in the direction of view of FIGS. 11 and 12 for example. A mechanical link 98 couples the lever 96 to the stirrup 90 such that viewing the parts as shown in FIG. 11 for example a pivoting movement of the lever 96 from the left to the right lowers the stirrup 90, thus moving it transversely of the axis of the sleeve 44, and slides the switching member 80 to the left, and thus longitudinally in relation to the axis of the sleeve 44, whereas movement of the lever to the left moves these various parts in the respective opposite directions. The movement of the switching member 80 for example from its left-hand position as viewed in FIG. 11 to its right-hand position as viewed in FIG. 11 is the step represented by the change from FIG. 11a to FIG. 11b. The flange 70 and with it the sleeve 44 remain at this stage in the left-hand position, but are nonetheless urged by the tension springs 88 acting on the left-hand plate 84 which in turn presses the flange 70 to urge the latter and with it the sleeve 44 towards the right-hand position. As and when the teeth 46 are able to slide from engagement with the teeth 60 of the gear wheel 48 into engagement with the teeth 62 of the gear wheel 56, the left-hand plate 84 now moves to the right under the action of the tension springs 88, and with it the flange 70 and the sleeve 44. This is the change illustrated in FIG. 11c relative to FIG. 11b.

Figure 11A:
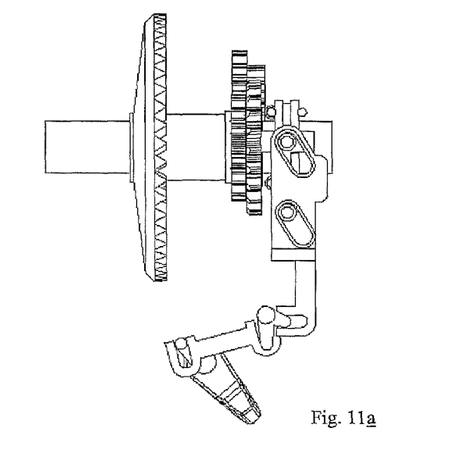
FIGS. 11a to 11d show respective side views of the parts shown in FIGS. 9a to 9d, respectively.
Figure 11B:
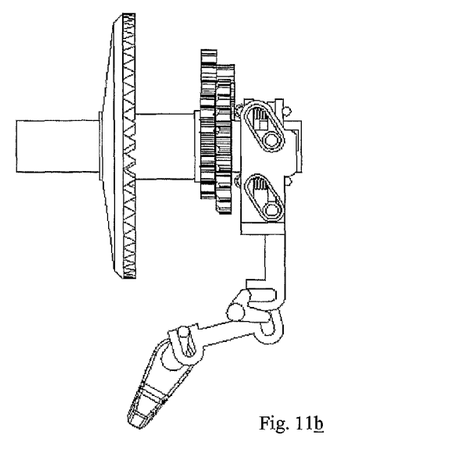
Figure 11C:
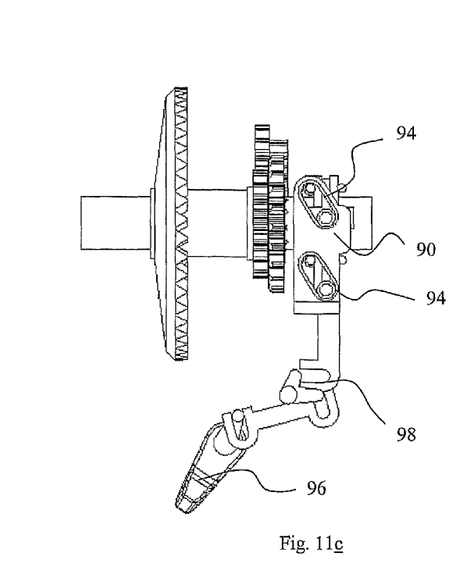
Figure 11D:
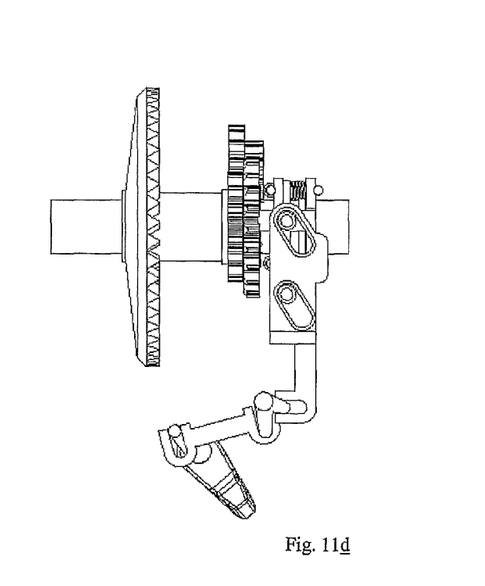
Figure 12A:
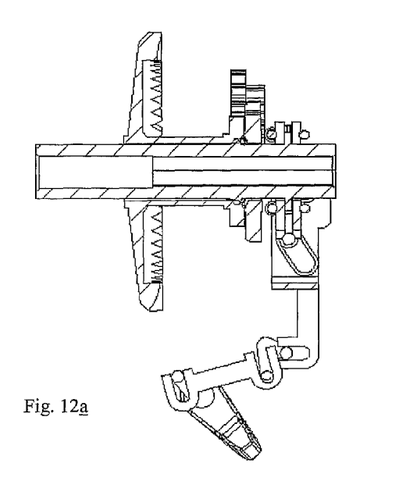
FIGS. 12a to 12d show respective axial sectional views of the parts shown in FIG. 11, viewed from the side.
Figure 12B:
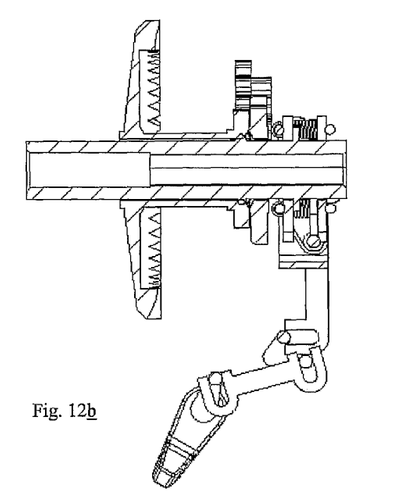
Figure 12C:
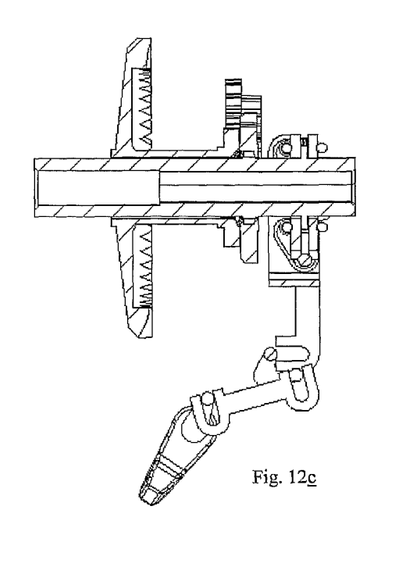
Figure 12D:
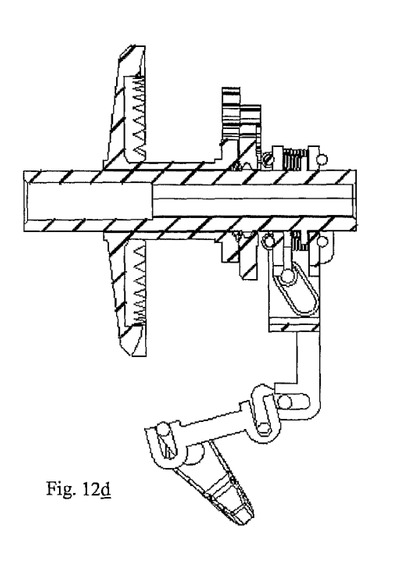
Figure 13:
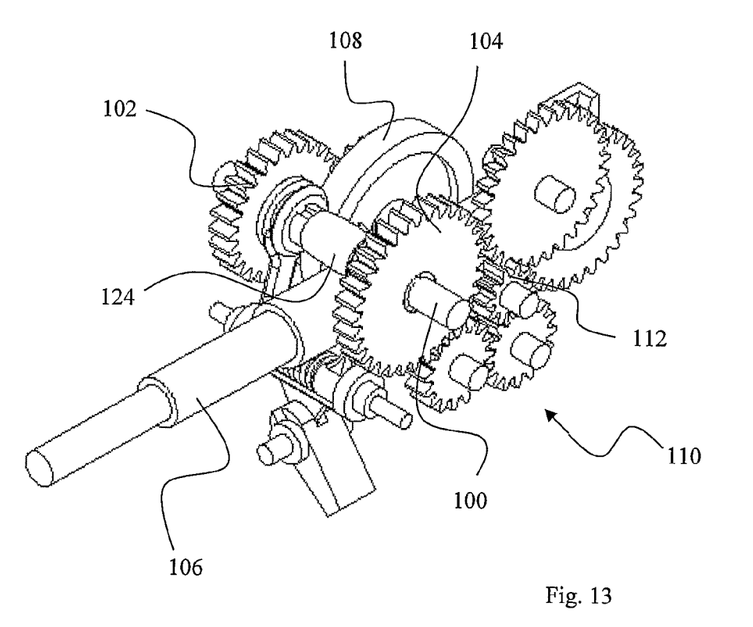
FIG. 13 shows a perspective view from above, from one end and from one side of a modified form of drive for the reel.
Figure 14:
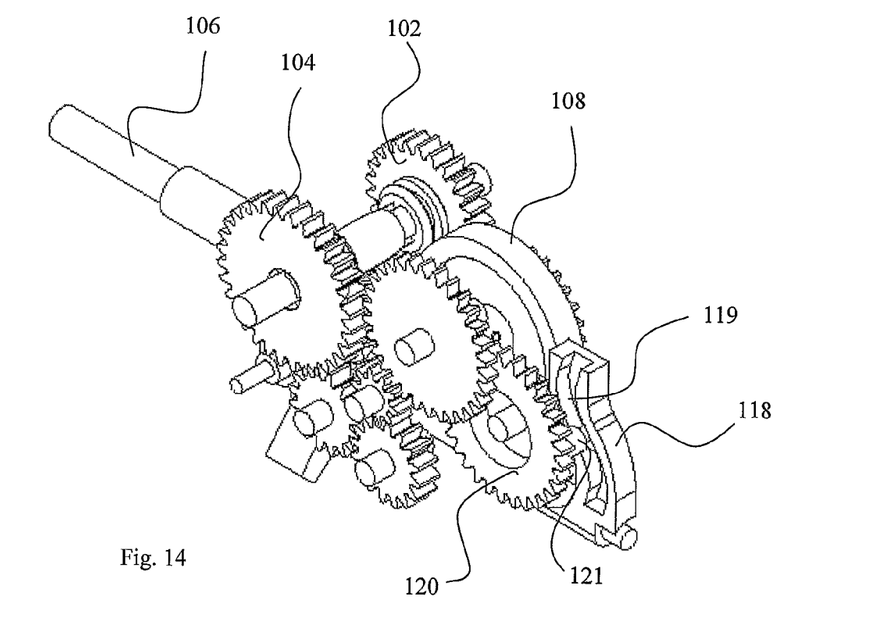
FIG. 14 shows a corresponding view of the drive shown in FIG. 13 from the other end.
Figure 15A:
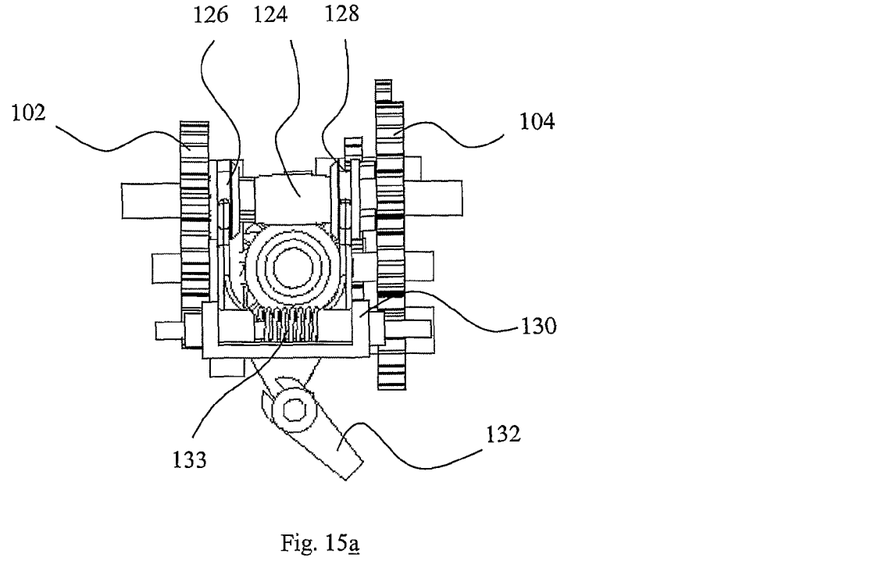
FIGS. 15a and 15b show opposite end views of the drive shown in FIGS. 13 and 14.
Figure 15B:
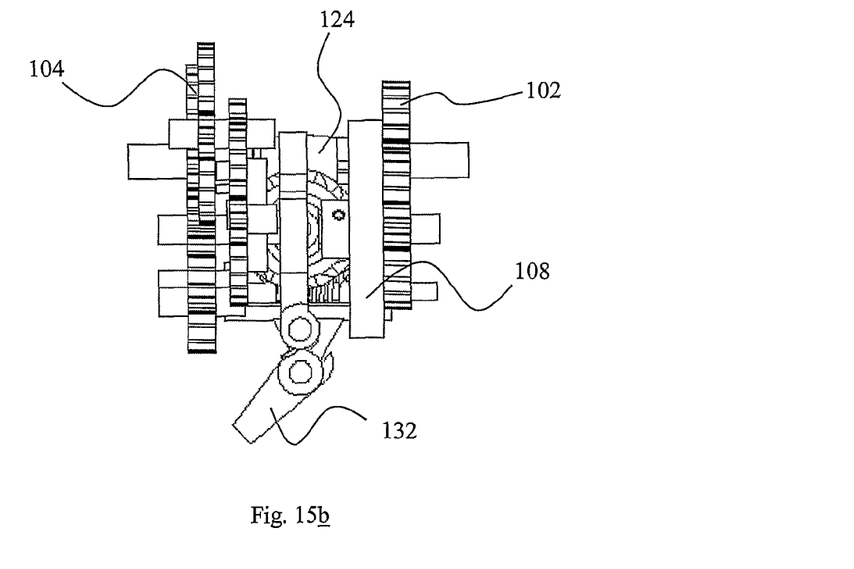
Figure 16:
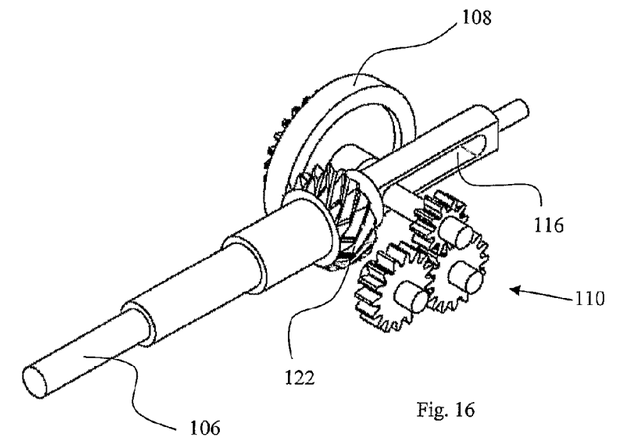
FIG. 16 shows a view corresponding to that of FIG. 13 with parts of the drive removed to reveal other features of the drive.
Figure 17:
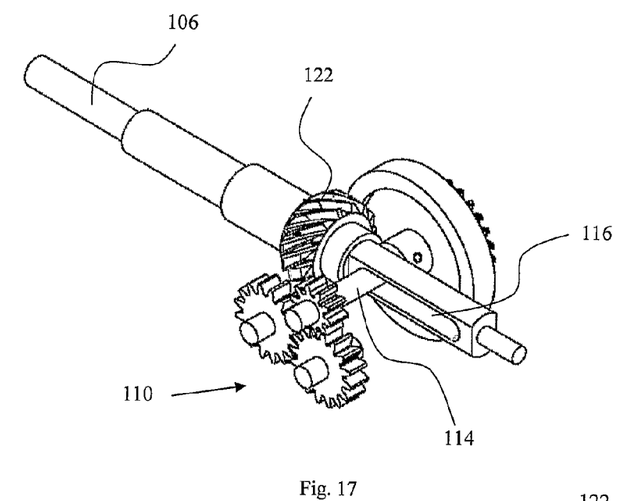
FIG. 17 shows a view corresponding to that of FIG. 14 with parts of the drive removed to reveal other features of the drive.
Figure 18A:
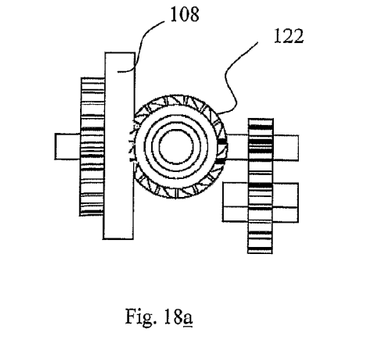
FIGS. 18a and 18b show opposite end views of the parts of the drive shown in FIGS. 16 and 17.
Figure 18B:
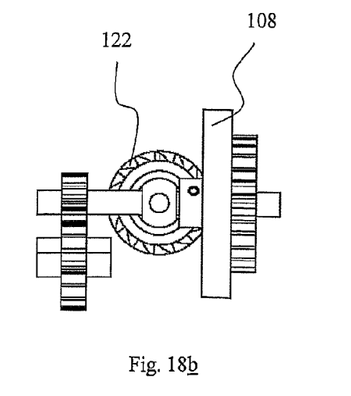

Moving the lever 96 back to its left-hand position will now move the switching member 82 and with it the left-hand plate 84 leftwards, being the change illustrated in going from FIG. 11c to FIG. 11d. Once the teeth 46 are free to disengage the teeth 62 of the wheel 56 and to engage the teeth 60 of the wheel 48, the action of the springs 88 on the right-hand plate 84 shifts that plate, and with it the flange 70 and the sleeve 44 leftwards. This transition is represented in FIG. 11 by going from FIG. 11d back to FIG. 11a.

Whilst the sleeve 44 has a wider cross-section at one end than at the other in FIGS. 6 to 12, it is preferable for that sleeve to be formed so that it has hollows at least at both its ends of the same internal cross-section. These cross-sections are both non-circular. Rotatable spigots (not shown) having the same external cross-section as the internal cross-section of these hollows extend respectively from the crank 20 and a securing portion on the opposite side of the housing 16. These spigots do not extend the whole way into the hollow, to ensure that the sleeve 44 is free to be moved to the left or to the right whilst the spigots (not shown) inserted into the sleeve 44 remain fixed in the longitudinal direction of the axis of the sleeve 44. Furthermore, because of the symmetry of such a sleeve 44, the crank 20 and the securing portion (not shown) can be swapped to change the reel from a left-hand reel to a right-hand reel or vice versa.

Numerous variations and modifications to the illustrated reel may occur to the reader without taking the resulting construction outside the scope of the present invention. To give one example only, instead of a lever 96, the more direct link to the stirrup 90 could be effected by way of a push button on the underside of the housing 16 of the reel 10 to effect up and down movement of the stirrup 90. The gear ratios may be different from the ones given herein.

In the modified drive shown in FIGS. 13 to 18, a tranverse axle 100 can be connected by releasable connection devices (not shown) to the handle 18 selectively at either one of its two ends, to provide a right- or left-handed reel.

Two gear wheels 102 and 104 of different respective diameters are attached to this axle 100 so as to be in respective spaced apart fixed positions on the axle 100, but also so as to be rotatable relative thereto and also therewith.

A spool shaft 106 to which the spool 26 is attached extends at right angles to the axle 100, longitudinally of the reel. The two gear wheels 102 and 104 are on opposite respective sides of the spool shaft 106. The gear wheel 102 meshes directly with an oscillatory motion mechanism drive wheel 108. The gear wheel 104 is coupled to drive the wheel 108 via a gear train 110, the end gear wheel 112 of which is rotationally fixed to and is co-axial with the wheel 108. The wheels 112 and 108 are fixed together by way of a transverse shaft 114 which extends through a slot 116 which is in and extends longitudinally along the spool shaft 106.

A block 118 at the end of the spool shaft 106 which is further from the spool 26 is formed with an S-slot 119 which receives a spigot 121 on the side of an oscillatory motion effecting wheel 120 coupled to be driven by the wheel 108.

The wheel 108 is also coupled to drive a bevelled gear 122 itself coupled to rotate the bail arm 22 whilst the spool 26 is being moved forwards and backwards by the oscillating mechanism.

Rotationally fixed on but slideable along the axle 100 is a hollow shaft 124 at opposite ends of which are respective dog gears 126 and 128. The length of the shaft 124 is such that when the dog gear 126 is coupled to the gear wheel 102, the dog gear is uncoupled from the gear wheel 104, and vice versa. A slideable bracket 130 below the shaft 124 can be moved transversely by the user by means of a lever 132 linked to the bracket 130. A helical compression spring 133 is located relative to the bracket in such a fashion that when the lever 132 is operated, the shaft 124 is urged in a direction to change gear, but the gear is only actually changed when the relevant dog gear meshes with a part of the relevant one of the said two gears 102 and 104.

It will be appreciated that switching the lever 132 thereby changes the gearing between spool oscillation speed and bail arm speed on the one hand and the speed with which the handle 18 is rotated on the other hand. Desirably the two ratios either one of which can be selected are 6.5:1 and 2:1.

Numerous variations and modifications to the illustrated reel may occur to the reader without taking the resulting construction outside the scope of the present invention. To give one example only, the gear ratios could be changed.

The invention claimed is:

1. A fixed spool fishing reel having a handle shaft connected to a handle to be rotated thereby and coupled to a bail arm drive of the reel so that rotation of the handle shaft causes rotation of the bail arm, in which the handle shaft is coupled to the bail arm drive via a gear mechanism that enables the gear ratio between rotation of the handle shaft and rotation of the bail arm drive to be selectively altered, in which the handle is readily releaseably connected to either selected one of the two ends of the handle shaft, characterized in that the handle shaft extends through a hollow dog gear shaft which is rotationally fixed on but slidable along the handle shaft, which dog gear shaft is provided with dog gears at both of its ends, couplable respectively to two gear wheels of the said gear mechanism, the length of the dog gear shaft being such that when one of its ends is coupled to its associated gear wheel the other is not, and correspondingly when the other of its ends is coupled to its associated gear wheel the said one of its ends is not.

2. A fixed spool fishing reel according to claim 1, characterised in that the said two gear wheels are respectively on opposite sides of a spool shaft of the reel, coupling between each of the said two gear wheels and a spool shaft oscillatory mechanism of the reel being via respective gearing arrangements to impart different respective ratios of handle rotary speed to oscillatory speed of the spool shaft.

3. A fixed spool fishing reel according to claim 2, characterised in that the spool shaft has a slot in it, and the coupling between one of the said two gear wheels and the oscillatory mechanism is by way of a shaft which passes through the said slot.

4. A fixed spool fishing reel according to claim 2, characterised in that the hollow dog gear shaft may be moved towards and away from both of the said two gear wheels by way of a lever coupled to the dog gear shaft via a resilient member whereby each dog gear shaft will be urged into engagement with the associated one of the said two gear wheels, and will so engage once they have an appropriate relative angular position.

5. A fixed spool fishing reel having a spool shaft and two gear wheels respectively on opposite sides of the spool shaft, both gear wheels being coupled to be driven by a rotary handle of the reel and both being selectable to be the one which drives a spool shaft oscillatory mechanism of the reel, the coupling between each of the said two gear wheels and the mechanism being via respective gearing arrangements to impart different respective ratios of handle rotary speed to oscillatory speed of the spool shaft.

6. A fixed spool fishing reel according to claim 5, characterised in that handle is readily releaseably connected to either selected one of the two sides of the reel.

7. A fixed spool fishing reel according to claim 5, characterised in that spool shaft has a slot in it, and the coupling between one of the said gear wheels and the mechanism is by way of a shaft which passes through the said slot.

8. A fixed spool fishing reel according to claim 5, characterised in that the two gear wheels are selectively engaged by at least one dog gear which is movable towards and away from both of the said two gear wheels.

9. A fixed spool fishing reel according to claim 8, characterised in that there are two such dog gears at opposite ends of a shaft, the dog gears respectively engaging the said two gear wheels.

10. A fixed spool fishing reel according to claim 9, characterised in that the dog gear shaft may be hollow and a drive shaft which drives both of the said two gear wheels via the dog gear shaft extends through that hollow shaft.

11. A fixed spool fishing reel according to claim 8, characterised in that the or both dog gears may be moved towards and away from one or both of the said two gear wheels by way of a lever coupled to at least one dog gear via a resilient member whereby at least one dog gear will be urged into engagement with one of the said two gear wheels, and will so engage once they have an appropriate relative angular position.

* * * * *